Patented Oct. 30, 1934

1,978,755

UNITED STATES PATENT OFFICE 1,978,755

MANUFACTURING READILY SOLUBLE BASIC DYES

Werner Müller, Cologne-on-the-Rhine, and Otto Böger, Dessau in Anhalt, Germany, assignors to General Aniline Works, Inc., New York, N. Y., a corporation of Delaware No Drawing. Application May 26, 1932, Serial No. 613,766. In Germany June 6, 1931

12 Claims. (Cl. 260—65)

This invention relates to the manufacture of readily soluble basic dyes.

It is known that some basic dyes on the market have but a small solubility, so that they are only capable of limited application and are unsuitable for other purposes, for instance, for dyeing paper and dyeing in the concentrated dye liquor. Moreover, such dyes involve the drawback of tending to bronze and resinify.

Moreover, the production of new dyes often fails for the reason that their solubility is insufficient, for example when higher substituted intermediate products are used, so that it was hardly possible when proceeding in this manner to arrive at a technical utilization of dyes having novel shades. The inconvenience is often due to the fact that the intermediate or preliminary products are already insoluble to such a degree that they cannot be satisfactorily worked up and by-products are formed which affect the yield of dye and the clearness of the shades. A further inconvenience may be that the dyes finally obtained no longer form soluble dye salts with the usual acids.

It has now been established that this insolubility is in general due to the nature of the acids employed for transforming the base into the salt, such acids being chiefly hydrochloric acid and sulfuric acid, whilst oxalic acid, nitric acid and the like may also be used. It has been found that the most sparingly soluble dye salts are generally formed by nitric acid, whereas hydrochloric acid, sulfuric acid, oxalic acid and formic acid form salts that are more easily soluble. Often, however, it is not possible to dispense with the use of nitric acid, because it is this very acid which, for instance, in the triarylmethane series, is capable of readily dissolving very sparingly soluble leuco dyes, such as the dyes from 4-diethylamino-2-chloro-benzaldehyde and meta-chloro-diethylaniline. The difficulty then is to give the dye salt a solubility that is satisfactory to a certain extent; attempts have been made to render it sufficiently soluble by extracting or boiling it with acetic acid diluted to a greater or less degree.

Furthermore, when proceeding to prepare new dyes according to the ketone process by employing components having the property of rendering the product difficultly soluble, such dyes are in fact obtained; but they cannot be utilized in practice. Thus, for instance, the dye obtained from tetramethyldiaminodiphenylketone (Michler's ketone) and alpha-beta-dinaphthylamine is almost insoluble in cold and hot water, with the result that no use has been made of it hitherto.

According to the present invention dyes which, for the reasons hereinbefore stated were useless or had only a limited range of application, can easily be made readily soluble by employing phosphoric acid instead of the acids hitherto used for this purpose. The use of phosphoric acid involves various technical advantages which could in no way be expected. Dyes are thus obtained the solubility of which is often far greater than a hundredfold the solubility of the dyes hitherto used. They can be dissolved in a very concentrated form, a fact that is of high importance for machine and paper dyeing, and have not the slightest tendency to resinify or bronze. Moreover, in contradistinction to numerous dye salts hitherto employed, they are very well absorbed by fibers mordanted with artificial mordants, such as, for example, a compound obtainable by causing a sulfur halide to react with a phenol or a homologue or substitution product thereof or with a naphthol in the presence or absence of metals such as tin or antimony, whereby the clearness of shade of the dyeings produced on fibers which have been mordanted by means of the said artificial mordants is displayed to great advantage. The present invention furthermore allows of utilizing and preparing a large number of new dyes with novel shades, because higher substituted intermediate products can now be used.

The phosphoric acid can be employed in a variety of ways. The dye salts can be entered into water in the form in which they have been produced while stirring, and then be mixed with one or two equivalents of phosphoric acid, whereupon the sparingly soluble dye salt generally begins to dissolve. The reaction is preferably completed by heating, if required, up to the boiling point. It is frequently advantageous to add a small amount of an alkali phosphate by which the double decomposition of the dye salt is apparently promoted. The dissolved dye is salted out by means of a soluble alkali phosphate. Dye bases are converted into the phosphates, by dissolving them in dilute phosphoric acid. In cases where the preliminary product, for instance, a leuco-dye is soluble in dilute phosphoric acid, the oxidation can be carried out in a phosphoric acid solution, by which means the soluble dye is obtained directly.

As is apparent from the foregoing, the phosphoric acid may, generally speaking, be introduced at any point of the manufacture of the dyes where difficulties of the hereinbefore described kind arise.

As the phosphates generally crystallize well, the troublesome resinification of the finished dyes can in most cases be avoided. Pure high grade dyes of clear shades are obtained. Moreover, the excellent solubility of these salts permits the strong dilutions, necessitating the use of very large vessels especially in the manufacture of the triarylmethane dyes on a technical scale to be avoided during the manufacture of the dyes. Leuco dyes, for instance, can be oxidized in concentrated solutions, whereby the dye salts can be precipitated in a quantitative yield; after elimination of the liquor, they are easily dissolved by means of dilute phosphoric acid.

Our new method of bettering the solubility either of the finished dyes or of the intermediate product serving for their manufacture, is applicable in all cases where basic products are used; thus as well basic triphenylmethane dyes as basic azo dyes or azines and so on may be worked up in the manner described.

The following examples will serve to illustrate the invention, the parts being by weight.

*Example 1.*—46 parts of the triarylmethyl dye known as Victoria blue R (cf. Schultz, Farbstofftabellen, 7th edition, No. 821) are made into a paste with 1000 parts of water and the paste is mixed, while stirring, with 15 parts of phosphoric acid (molecular weight 98) in form of the commercial concentrated acid of 85% strength, and 6 parts of sodium phosphate. After a short time the solution is slowly heated for 30 minutes until the boiling point is reached. The solution is then filtered in order to remove any impurities which may be present. The filtered solution is allowed to cool and the dye is salted out by means of an alkali phosphate. The dye obtained has an excellent solubility.

In the same manner all similar dyes may be transformed into products that are very easily soluble; without limiting our invention we enumerate, for instance, (the numbers given refer to Schultz, Farbstofftabellen, 7th edition) Victoria blue B, No. 822, Night blue B, No. 823, Victoria blue 4 R, No. 793, Auramine, No. 752, No. 753, Malachite green, No. 754, Ethyl green, No. 760, Fuchsine, No. 780, and so on.

*Example 2.*—The pressed moist dye from tetramethyldiaminodiphenylketone and alpha-beta-di-naphthylamine, present in the form of the hydrochloride and corresponding to 56 parts of dry substance, is made into a paste with about 5000 parts of water, mixed while stirring with 20 parts of phosphoric acid, stirred while cold for about 3 hours and then heated to boiling temperature for 3 hours. After filtering and salting out, an easily soluble, blue, well crystallized dye is obtained.

The hydrochloride, on the contrary, is so difficultly soluble that it was quite impossible to use it for dyeing purposes. With the aid of the hereinbefore described phosphoric acid salt it furthermore becomes possible to purify the dye by recrystallization, so that pure products are obtained which, when worked up, for instance, by sulfonation, yield clearer shades.

*Example 3.*—47 parts of the dye base of the dye obtained from benzaldehyde and n-butylhydroxyethylaniline are stirred with 1500 parts of water and 12 to 15 parts of phosphoric acid for about 12 hours and then heated to boiling temperature. After filtering and cooling, a sodium phosphate liquor of 48° Bé. is gradually introduced drop by drop, while stirring for 24 hours, the phosphate of the dye precipitating in bright gold-green crystals. It is readily soluble in water.

*Example 4.*—63 parts of the leuco base of the dye obtained from 1 molecular proportion of formaldehyde and 3 molecular proportions of 1-n-butylhydroxyethylamino-3-methylbenzene are dissolved by heating in 45 parts of phosphoric acid and 2500 parts of water; the solution is cooled and oxidized at 0° C., as usual, with lead peroxide. After stirring for about 15 minutes, the solution is filtered in order to eliminate the lead phosphate precipitated, and salted out, as usual. Whereas only about 16 parts of the sulfate dissolve in 1000 parts of hot water, 300 to 400 parts of the phosphate thus obtained readily dissolve in the same amount of water, without bronzing or resinifying taking place.

*Example 5.*—69 parts of the leuco base of the dye obtained from 1 molecular proportion of formaldehyde and 3 molecular proportions of 1 - n - butyl-hydroxyethylamino-3-chlorobenzene are dissolved in 1200 parts of a double normal solution of sulfuric acid and about 6000 parts of water and oxidized at 0° C. in the usual manner with lead peroxide. The dye and the lead sulfate are completely precipitated. After 15 minutes the solid matter is allowed to settle, the aqueous liquor is decanted, the residue is repeatedly washed with water and then mixed with about 5000 to 7000 parts of water, 19 parts of phosphoric acid and 6 parts of sodium phosphate. It commences to go up into solution immediately on stirring. The solution is allowed to stand for about 12 hours, whereafter it is heated to boiling temperature, filtered in order to eliminate the lead salt and salted out as usual. The new dye is readily soluble in water, whereas the other salts are almost completely insoluble.

*Example 6.*—48 parts of the isorosinduline from phenyl-beta-naphthylamine and para-nitrosoethylbenzylaniline, present in the form of the hydrochloride which is entirely insoluble in cold water, are heated, while stirring, with 1000 parts of water and 15 parts of phosphoric acid until the boiling temperature is reached. The solution is filtered and salted out, after cooling, in the usual manner. The well crystallized salt thus obtained easily dissolves in cold water.

The Safranine M N T (Schultz, Farbstofftabellen, 7th edition, No. 964) and the corresponding dyes enumerated by Schultz in this class of azines show a completely analogous behavior.

*Example 7.*—64 parts of the Safranine obtainable from the isorosinduline of Example 6 by oxidizing it together with 4-diethyl-amino-1-amino-benzene, are treated in the manner set forth in Example 6. The dye salt obtained has an extraordinarily high solubility in water.

*Example 8.*—32 parts of Methylene blue (cf. Schultz, Farbstofftabellen, 7th edition, No. 1038) are heated, while stirring, to boiling temperature with 300 parts of water, 15 parts of phosphoric acid and 6 parts of phosphate, and further treated as set forth in Examples 6 and 7. A readily soluble, well crystallized dye salt is obtained.

The other dyes of this group comprising thiazines and oxazines may be treated in like manner.

*Example 9.*—100 parts of Vesuvine B L (cf. Schultz, Farbstofftabellen, 7th edition, No. 318) are dissolved in 500 parts of boiling water and run in 60 parts of a caustic soda solution of 20% strength and 2000 parts of cold water. The precipitated dye is filtered by suction and washed until free of caustic alkali. Then it is dissolved in about 1500 parts of boiling water, while 60 parts of phosphoric acid in form of a high concentrated solution of 85% strength are added. At about 30° C. 400 parts by volume of a saturated solution of NaH$_2$PO$_4$ are run into the filtered solution. The separated dye salt has an essentially higher solubility than the corresponding hydrochloride.

Other basic azo dyes, such as, for instance, Chrysoidine (Schultz, Farbstofftabellen, 7th edition, No. 27) may be likewise transformed into easily soluble salts of phosphoric acid.

What we claim is:—

1. Phosphoric acid salts of basic dyes, said salts being easily soluble in water.

2. Phosphoric acid salts of basic triarylmethane dyes, said salts being easily soluble in water.

3. Phosphoric acid salts of basic triarylmethane dyes of the general formula

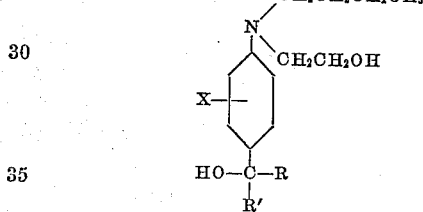

wherein X means hydrogen, methyl or chlorine and wherein R and R' mean phenyl or an aminophenyl, said dyes being easily soluble in water.

4. Phosphoric acid salts of basic triarylmethane dyes of the general formula

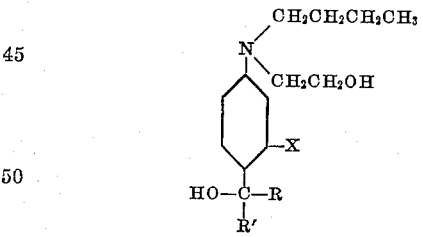

wherein X means hydrogen, methyl or chlorine and wherein R and R' mean phenyl or an aminophenyl, said dyes being easily soluble in water.

5. The phosphoric acid salt of the basic dye of the triphenyl methane series corresponding to the formula

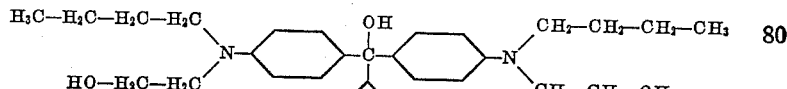

said dye being easily soluble in water.

6. The phosphoric acid salt of the basic dye of the triphenylmethane series corresponding to the formula

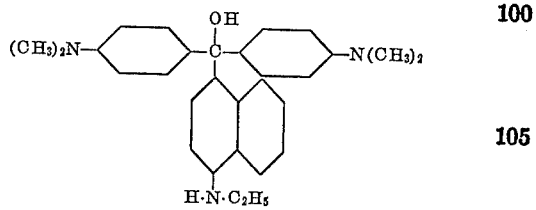

said dye being easily soluble in water.

7. The phosphoric acid salt of the basic dye of the triphenylmethane series corresponding to the formula

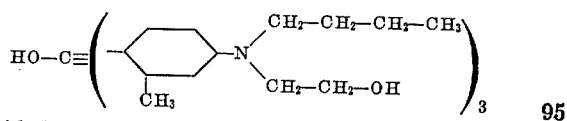

said dye being easily soluble in water.

8. The process for manufacturing easily soluble salts of basic dyes which comprises binding the basic constituent of the dye with phosphoric acid.

9. The process for manufacturing easily soluble salts of basic dyes which comprises binding the basic constituent of the dye with phosphoric acid in the course of the preparation of the dye.

10. The process which comprises treating di-(n- butylhydroxyethylaminophenyl) - phenylcarbinol with phosphoric acid.

11. The process which comprises oxidizing tri-(1-n-butylhydroxyethylamino-3-methyl) - methane in the presence of phosphoric acid.

12. The process which comprises treating tetramethyl - ethyl - para - para' - diaminodiphenonaphthofuchsonimmoniumchloride (Victoria blue R) with phosphoric acid in the presence of sodium phosphate.

WERNER MÜLLER.
OTTO BÖGER.